Sept. 16, 1969　　D. L. TIMBERLAKE ET AL　　3,466,750
OCCLUDER
Filed Aug. 16, 1966　　2 Sheets-Sheet 1

INVENTOR.
Dale L. Timberlake
Wallace R. Kean
BY
TW Servest
ATTORNEY

Sept. 16, 1969  D. L. TIMBERLAKE ET AL  3,466,750
OCCLUDER
Filed Aug. 16, 1966  2 Sheets-Sheet 2
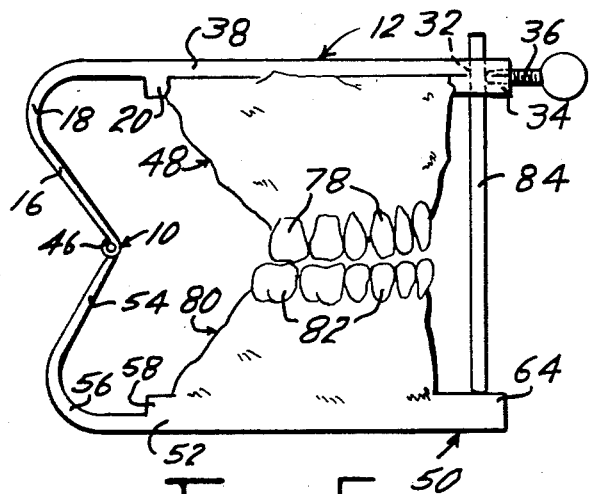
FIG. 5
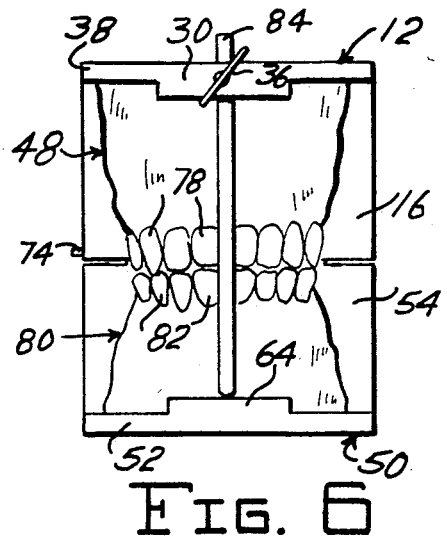
FIG. 6
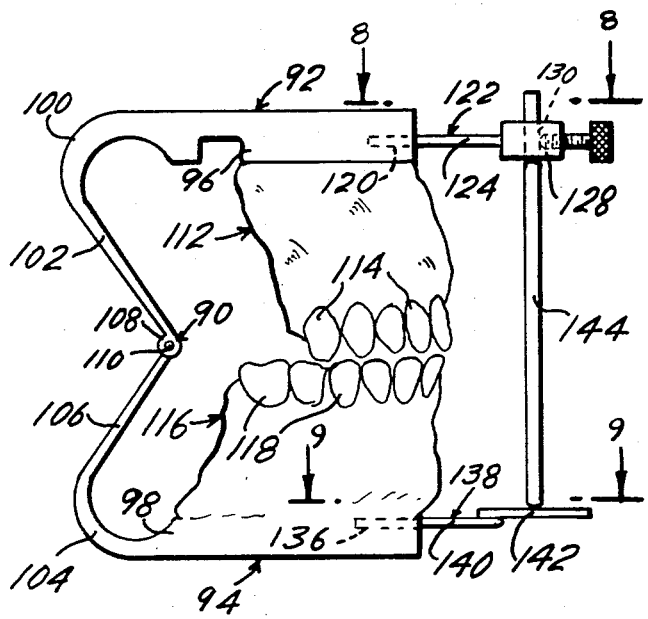
FIG. 7
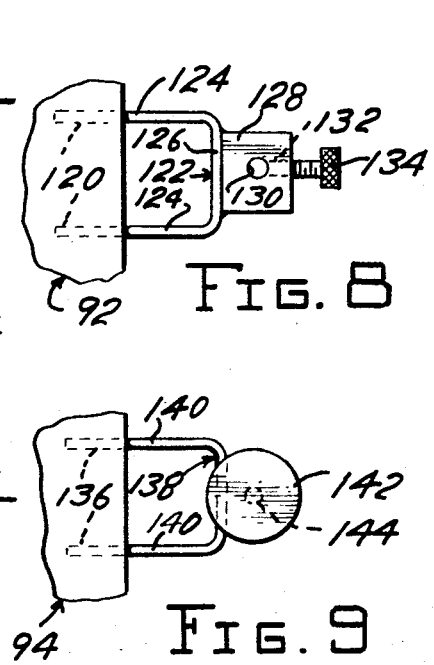
FIG. 8
FIG. 9
INVENTOR.
Dale L. Timberlake
Wallace R. Kern
BY
TW Servest
ATTORNEY

United States Patent Office 3,466,750
Patented Sept. 16, 1969

3,466,750
OCCLUDER
Dale L. Timberlake, 1331 W. Camelback Road, Phoenix, Ariz. 85013, and Wallace R. Kean, 134 Elm, Apt. 101, San Mateo, Calif. 94401
Filed Aug. 16, 1966, Ser. No. 572,843
Int. Cl. A61c 11/00
U.S. Cl. 32—32          6 Claims

ABSTRACT OF THE DISCLOSURE

This invention is for an occluder to hold dental models so that the occlusal surfaces of the upper and lower teeth may be made to move through arcs by reproducing movements of the jaws of an individual. This occluder is made of plastic and therefore possesses a certain degree of flexibility. Also, the configuration of the occluder is such as to have inherent flexibility. With the flexibility of the plastic and the inherent flexibility of the configuration, the upper and lower jaws of the occluder can be manipulated by the dentist to simulate the movements of the person for whom the dental model is being prepared.

---

A review of the patent art reveals that there have been patented many correlators and articulators for positioning dental molds and dental casts. One of these, Johnson et al., United States Letters Patent No. 2,430,177, is for a correlator having an upper plate and a lower plate for positioning dental casts. The upper plate and the lower plate are united by means of helixes and a connecting means. Other articulators and dental model holders are shown by Lentz 2,235,524 and Scullin 3,221,408.

From having worked in the dental field and being associated with the dental field and also being a practicing dentist we have considered the various articulators, correlators and dental model holders and have invented this occluder which we believe has certain advantages. One of the primary objects of this occluder is to provide horizontal flexibility as the occluder allows for adjustment in retruding the mandibular cast, i.e., the cast of the lower jaw, when mountings were made with an incorrect bite relationship. Also, this occluder has vertical flexibility as the occluder allows for a normal relationship when casts are mounted with a bite incorporating a posterior open bite. In addition, the occluder allows for lateral movement as the occluder allows the mandibular cast to be moved laterally with respect to the maxillary cast, i.e., the upper jaws.

In view of other correlators, articulators and dental model holders and also some of the features of our occluder an object of this invention is to provide an occluder having a simplicity of operation so that it may be used in a routine manner by dental technicians; to provide an occluder having a low cost of manufacture; to provide an occluder having a low cost of maintenance; to provide an occluder having no corrosion problems; to provide an occluder where there is ease in replacing parts; to provide an occluder having a wide variation of uses for use with a quarter arch, half arch, full models and edentulas; to provide an occluder whereby it is easy to reassemble casts on the occluder once the casts have been removed; to provide an occluder so shaped as to fit the hand for ease of holding and manipulating; to provide an occluder having a more complete movement of the lower and the upper jaw relative to each other; to provide an occluder which makes it possible to use a hard plaster or a hard dental stone for mounting purposes as the use of a hard dental stone is beneficial as there is less expansion of the stone so as to have a more exact relationship between the cast of the upper jaw and the cast of the lower jaw; to provide an occluder which saves a step in the mounting of the cast of the jaw on the occluder; to provide an occluder wherein there is positive control of the vertical opening between the upper jaw and the lower jaw by means of a pin stop; to provide an occluder wherein the resiliency of the materials of construction leads to a longer life; to provide an occluder which is acid resistant thereby making it possible to clean the occluder by means of acid; to provide an occluder which eliminates problems of breaking casts when freeing the casts from the occluder; to provide an occluder wherein the memory and resiliency of the materials of construction of the occluder allow simulated mandibular movement necessary for precise and accurate fabrication of dental prosthesis; to provide an occluder which is durable and yet of simple construction; to provide an occluder having a self-cleaning surface; to provide an occluder having a design which allows for the usage of more different standard dental material; to provide an occluder which can be used a number of times without change in the surface, shape or function; and, to provide an occluder which takes into account correction of the mounting of the occlusal relationship between the teeth of the upper jaw and the teeth of the lower jaw.

These and other important objects and advantages of the invention will be brought forth upon reference to the accompanying drawings, the detailed specification of the invention and the appended claims.

Figure 1:
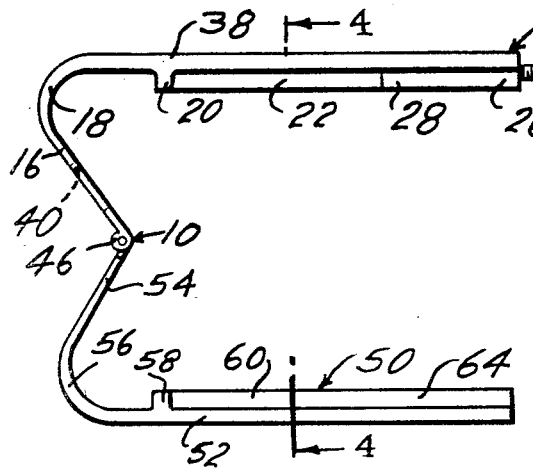
FIGURE 1 is a side elevational view of a specific embodiment of the occluder constructed in accordance with the preferred teachings thereof.
Figure 2:
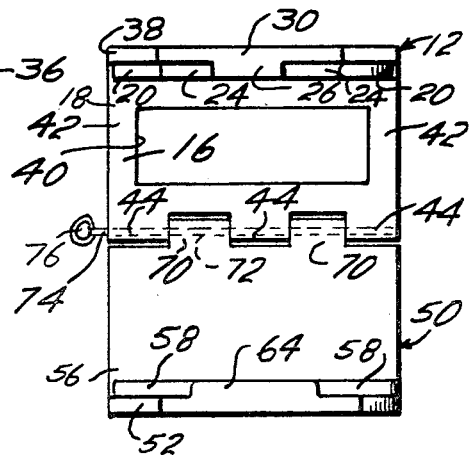
FIGURE 2 is a front elevational view of the occluder.
Figure 3:
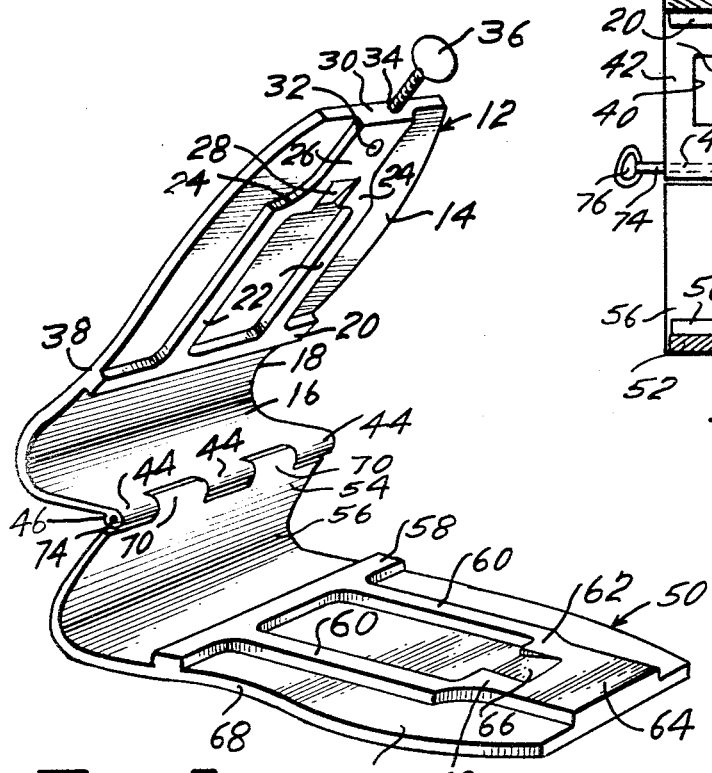
Figure 4:
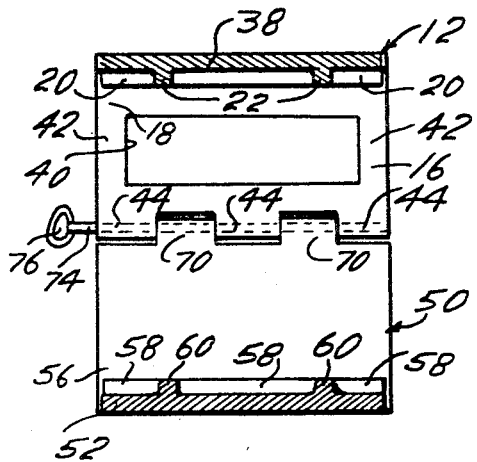

FIGURE 3, on an enlarged scale, is a perspective view looking at the occluder with the upper member and the lower member being separated from each other so as to show details of construction of these two members;

FIGURE 4, on a smaller scale, taken on line 4—4 of FIGURE 1, is a vertical lateral cross-sectional view illustrating details of construction of the occluder;

FIGURE 5 is a side elevational view illustrating an upper dental cast and a lower dental cast positioned in the occluder;

FIGURE 6 is a front elevational view illustrating the upper dental cast and the lower dental cast positioned in the occluder;

FIGURE 7 is a side elevational view of another preferred embodiment of the occluder and illustrates an upper dental cast and a lower dental cast in the occluder;

FIGURE 8, taken on line 8—8 of FIGURE 7, is a fragmentary plan view looking down on another stop means associated with the upper member of the occluder; and, FIGURE 9, taken on line 9—9 of FIGURE 7 is a fragmentary horizontal cross-sectional view illustrating another stop means associated with the lower member of the occluder.

In the drawings it is seen that there is an occluder 10. The occluder 10 is designed so as to allow the movements of the mandible, the lower jaw, to be from above the mandible and in the head controlling portion. Further, the occluder 10 is designed so that there can be an adjustment in the area of deformation with respect to the occlusal surfaces. This makes possible a posterior vertical adjustment.

The occluder 10 comprises an upper member 12. The upper member 12 comprises an upper base 14 and a first connecting member 16. It is seen that the upper base 14 curves at 18 to form the first connecting member 16. On the lower surface of the upper member 12 there is a lateral mounting cleat or rib 20 adjacent the curved portion 18. Also, there are two spaced apart longitudinal mounting cleats or ribs 22. These two spaced apart longitudinal mounting cleats or ribs 22 run forwardly and curve inwardly at 24 to form a reinforced region 26. The reinforced region has an inclined surface 28 leading to the region between the two longitudinal mounting cleats 22, the lateral mounting cleat 20 and the curved portion 24. It is seen that the mounting cleats 20 and 22, the curved portion 24 and the reinforced region 26 are one continuous structure. Further, it is seen that the upper member 12 and the reinforced region 26 provide a thickened end 30. At right angles to the plane of the upper member 12 and in the thickened end 30 there is a passageway 32. In the thickened end 30 there is a tapped hole 34. In the tapped hole 34 there is a wing screw 36. It is seen in FIGURE 3 that in the region of the thickened end 30 that the upper member 12 is narrower than near the center part of the longitudinal mounting cleats 22 and then the upper member 12 narrows down to a waist portion 38 and then broadens out into the curved portion 18 and into the first connecting member 16.

In the first connecting member 16 there is an opening 40. The opening 40 in conjunction with the sides of the first connecting member 16 defines supporting structure 42. The first connecting member 16 terminates in three spaced apart hinge members 44. In each of these hinge members 44 there is a passageway 46. The passageways 46 in the three hinge sections 44 are aligned.

In FIGURE 1 it is seen that the first connecting member 16 is of a narrower thickness or of a less thickness than the base 14 of the upper member 12. This is designed so as to allow a greater freedom of movement and manipulation for the upper member 12 around the first connecting member 16. Further, the opening 40 assists in insuring that there is greater freedom of movement and manipulation around the first connecting member 16.

The upper member 12 mounts the maxillary cast 48.

The occluder can also comprise a lower member 50 having a lower base 52 and a second connecting member 54. The second connecting member 54 connects with the lower base 52 by means of a curved region 56. On the lower member 50 there is a lateral mounting cleat 58 near the curved region 56. Also, there are two spaced apart longitudinal mounting cleats 60 which extend forwardly from the lateral cleat 58. At the forward end of the lower member 50 the two longitudinal cleats 60 curve inwardly at 62 to form a bearing region 64. In the back of the bearing region 64 there is an inclined surface 66. It is seen that the forward part of the lower member 50 near the bearing region 64 is narrower than at that portion near the two longitudinal mounting cleats 60. Also, the lower member 50 tapers inwardly at 68 to form a waist portion. Then, the waist portion curves outwardly into the second connecting members 54.

The second connecting member 54 terminates in two spaced apart hinge members 70. In the two spaced apart hinge members 70 there are passageways 72. The passageways 72 and the hinge members 70 are aligned. A rod 74 is inserted into the passageways 46 and 72 to unite the upper member 12 and the lower member 15. The rod 74 has a handle or gripping means 76.

In FIGURE 1 it is seen that the second connecting member 54 is of less thickness than the thickness of the lower base 52. Further, it is seen that with the opening 40 in the first connecting member 16 that the first connecting member 16 is more flexible than the second connecting member 54. This makes it possible for the lower member 50 to be more freely moved with respect to the second connecting member 54 so as to allow the movement of the mandible to be from above the mandible and in the head controlling portion, or in the occluder 10, in that portion in the region of the first connecting member 16.

Also, it is seen that on the lower base 52 and near the curve 56 that there is a lateral mounting cleat 58. Extending forwardly from the lateral mounting cleat 58 are two spaced apart longitudinal mounting cleats 60 which bend inwardly at 62 and join to form the bearing region 64. In the latter part of the bearing region 64 there is an inclined surface 66.

In FIGURE 5 it is seen that in the passageway 32 that there is a pin or rod 84. By means of a pin or rod 84 it is possible to adjust the position of the upper member 12 with respect to the lower member 50. The desired height or distance between the upper frame member 12 and the lower member 50 can be determined and then the wing screw 36 tightened so as to definitely position the rod 84.

In FIGURE 5 it is also seen that on the upper member 12 that there is mounted a maxillary cast 48 having teeth 78. On the lower member 50 there is mounted a mandibular cast 80 having teeth 82.

In FIGURES 5 and 6 it is seen that the position of the hinge members 44 and 70 and the hinge pin 46 are such that there can be adjustment in the area of deformation. This makes it possible to have posterior vertical adjustment of the maxillary cast 48 with respect to the mandibular cast 80. This is an important feature as the ability to adjust the occluder 10 in the area of deformation with respect to the teeth 78 and 82 in the upper cast 48 and the lower cast 80 is important as it is possible to more accurately simulate the movement of the maxilla and the mandible.

In FIGURE 5 is is also seen that the first connecting member 16 is somewhat thinner or of less thickness than the second connecting member 54. This is of value as it is possible to move the lower member 50 and the lower cast 80 around a region above the pin 46 and the hinge members 44 and 70 with said region being in the first connecting member 16. This means that the movement of the lower member 50 simulates the movement of the mandible so that the movement of the mandible is from above the mandible and in the head controlling portion.

In FIGURES 7, 8 and 9 there is illustrated a modification of the occluder and which occluder is referred to by reference numeral 90. The occluder 90 comprises an upper member 92 and a lower member 94. The upper member 92 has mounting cleats 96 and the lower member 94 has mounting cleats 98. Also, the upper member 92 curves at 100 to form a first connecting member 102. The lower member 94 curves at 104 into a second connecting member 106. The connecting members 102 and 106 form hinge members 108 which are connected by a pin 110. On the upper member 92 there is a maxillary cast 112 having teeth 114 and on the lower member 94 there is a mandibular cast 116 having teeth 118. In the forward edge of the upper member 92 there are two spaced apart holes 120. In the holes 120 there is positioned a yoke 122 having two legs 124 and a cross member 126. On the cross member 126 there is mounted a positioning plate 128 having a passageway 130 therein. There connects with the passageway 130 a tapped hole 132. In the tapped hole 132 there is a tightening screw 134.

In the front edge of the bottom member 94 there are two spaced apart holes 136. In the spaced apart holes 136 there is positioned a yoke 138 having two legs 140. There is mounted on the two legs 140 a bearing plate 142. The yoke 122 can be inserted into the holes 120 and the bearing plate 142 can be inserted into the holes 136. Then, a pin 144 can be positioned in the passageway 130 and the screw 134 tightens so as to position the upper member 92 with respect to the lower member 94 so that the maxillary cast 112 is definitely positioned with respect to the mandibular cast 116. This is a modification of the occluder 10 with respect to the means for positioning the upper member with respect to the lower member.

In the drawings it is seen that the mounting cleats are wider at their junction with the base than at their free surface so as to taper in width to allow release of the plaster holding the dental casts by virtue of the side walls of the cleats or ribs being thereby angled away slightly from the vertical.

The materials of construction of the occluder 10 and the occluder 90 are preferably of plastic. One of the plastics which we have found to be desirable is nylon. A nylon resin can be molded to give a desired configuration. Further, the nylon plastic has sufficient strength to allow an operator to squeeze together the upper member and the lower member so as to reproduce some of the movements of the mandible with respect to the maxilla and also to move the lower member horizontally and laterally with respect to the upper member so as to reproduce some of the movement of the mandibula with respect to the maxilla. However, it is to be understood that other desirable flexible materials may be used.

In FIGURES 1, 3 and 5 and also in FIGURE 7 it is seen that the first connecting member 16 bends forwardly so as to overlap the upper member 12 and that the second connecting member 54 bends forwardly so as to overlap the lower member 50. Further, the first connecting member 102 bends forwardly so as to overlap the upper member 92 and the second connecting member 106 bends forwardly so as to overlap the lower member 94. The overlapping of the member by means of the upper member or the lower member by means of the connecting members is desirable as it is possible to move the lower member more easily with respect to the upper member and to more positively simulate the movements of the mandible. Another desirable feature is that the occluder 10 or the occluder 90 occupies less volume with the connecting members bending so as to overlie or overlap the base members.

With the use of a plastic to be the material of construction of the occluder 10 it is possible to make a continuous unitary one piece upper member 12 and a continuous unitary one piece lower member 50. Further, with the use of the plastic it is possible to move the members around the hinge pin 46 or the hinge pin 110 and when the pressure is removed from these members then the occluder resumes its prior configuration. The plastic makes it possible to move the upper and lower members vertically with respect to each other, horizontally in a longitudinal manner and horizontally in a lateral manner with respect to each other. It is seen that a large combination of movements can be readily realized from this. Further, with the use of the plastic the thickness of the connecting members 16, 54, 102 and 106 can be readily controlled so that the connecting members 16 and 102 are of less thickness than the connecting members 54 and 106 so as to simulate the movement of the mandible more completely so that the mandible does not move around the rod 46 or the rod 110 but more completely moves around the region of the first connecting member 16 or the second connecting member 102 which is above the mandible so as to simulate the movement of the lower jaw. In addition, with the first connecting member 16 or 102 and the second connecting member 54 or 106 overlying their respective base members the pivot rod 46 or 110 is positioned near the occlusal surface of the posterior teeth, so that when there is a posterior open bite in the mounting it may be easier and more accurately adjusted.

Having presented our invention what we claim is:

1. An occluder comprising unitary non-metallic upper and lower members and a hinge means connection therefor, said lower member further comprising a relatively flat forward portion and a curved rear portion curving upward then inward of the flat forward portion, said rear portion being non-uniform in material thickness; said upper member further comprising a relatively flat forward portion and a curved rear portion curving downward, then inward of the flat forward portion; said hinge means connection securing the members together at the terminus of their curved portions whereby said curved rear portions impart a spring-like resilience to the occluder, permitting said upper and lower members to be resiliently moved relative to each other.

2. An occluder as in claim 1 wherein the rear portion of one of said members has an opening therein thereby providing increased flexibility thereto.

3. An occluder as in claim 1 wherein the rear portion of each said member is non-uniform in material thickness.

4. An occluder as in claim 1 wherein the forward portion of said members have generally flat opposing faces adapted for mounting maxillary and mandibular casts therebetween in a bit relationship, each said face having thereon a rib structure upstanding therefrom with generally vertical side walls and at least a portion of the generally vertical side walls being angled slightly away from the flat surface, said rib structure serving as the cast mounting means and permitting non-destructive removal of the casts from said faces.

5. An occluder comprising integral non-metallic upper and lower members and a hinge means connection therefor, said members having generally flat opposing faces adapted for mounting maxillary and mandibular casts therebetween in a bit relationship, each said face having thereon a rib structure upstanding therefrom with generally vertical side walls and at least a portion of the generally vertical side walls being angled slightly away from the flat surface, said rib structure serving as the cast mounting means and permitting non-destructive removal of the casts from said faces.

6. An occluder as in claim 5 wherein said rib structure comprises a plurality of ribs enclosing a rectangular area on the flat face and wherein side walls bounding the rectangular area are angled slightly away therefrom.

References Cited

UNITED STATES PATENTS

| | | | |
|---|---|---|---|
| 2,430,177 | 11/1947 | Johnson et al. | 32—32 |
| 2,592,288 | 4/1952 | Johnson | 32—32 |

ROBERT PESHOCK, Primary Examiner